L. B. JOYNER.
Rotary Cultivator
No. 27,987.  Patented Apr 24 1860
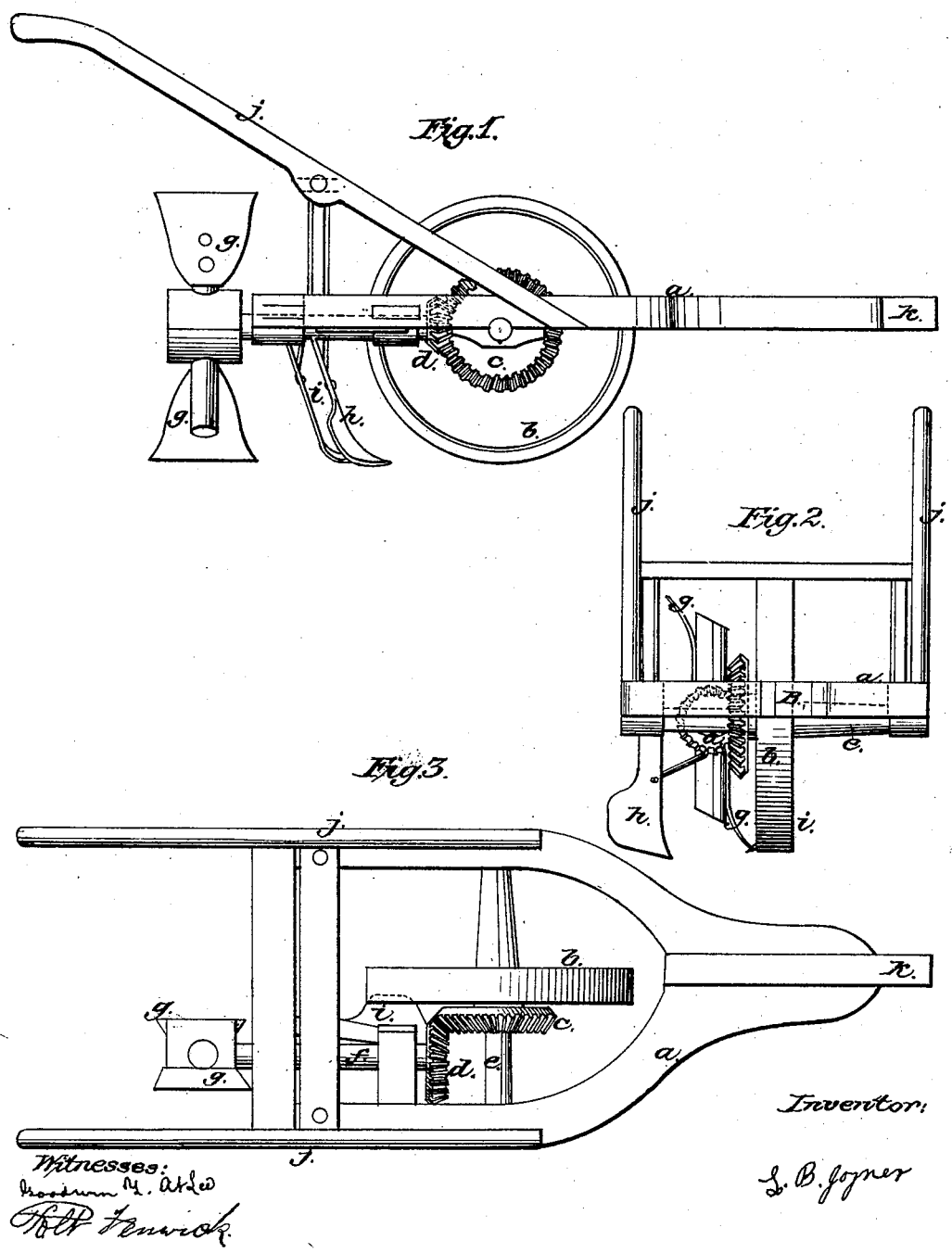

UNITED STATES PATENT OFFICE.

L. B. JOYNER, OF HILLIARDSTON, NORTH CAROLINA.

IMPROVEMENT IN COTTON-THINNING PLOWS.

Specification forming part of Letters Patent No. 27,987, dated April 24, 1860.

*To all whom it may concern:*

Be it known that I, L. B. JOYNER, of Hilliardston, in the county of Nash and State of North Carolina, have invented a new and useful Improvement in Cotton-Thinning Plows; and I do hereby declare that the following is a full, clear, and exact description of the same, reference being had to the accompanying drawings, forming a part of this specification, in which—

Figure 1 is a side view, Fig. 2 a front view, and Fig. 3 a plan, of the machine.

Similar letters of reference in each of the several figures indicate corresponding parts.

The nature of my invention consists in the arrangement of the shears, revolving cutters, frames, driving-wheel, and gear-wheels in the manner herein described. The advantage of thus arranging the parts of a cotton-thinning plow is that, although it straddles the row, only one horse can be used to draw the plow, while two horses are required for the usual cotton-thinning plow, which has the shares and cutters in the center of the machine.

To enable others skilled in the art to make and use my invention, I will proceed to describe its construction and operation.

The frame $a$ of the plow is supported on a central driving-wheel, $b$. Bevel-gearing $c$ $d$ serves to transfer motion from the driving-wheel shaft $e$ to the cutter-shaft $f$, which latter is furnished with a number of cutters, $g$, at its rear end. Plowshares $i$ $h$ are fastened to the frame, one at each side of the cutter-shaft $f$.

The cutter-shaft, with its cutters and the two plowshares, is arranged at one side of a line drawn through the center of the plow-frame and coincident with the path of the horse, the latter being hitched to the frame at $k$. Thus it will be seen the horse walks in the furrow between two rows of plants, while the shares $i$ $h$ are one at each side of one of the rows, and serve to throw the soil onto the plants of this row. The cutters $g$ $g$, which are arranged on the revolving shaft $f$ between the two shares, cut out alternate plants of the same row, and thus perform the operation of thinning the row. The driving-wheel $b$ is arranged as near as convenient to the inside plowshare, $i$, so as not to interfere with its function.

It will be observed that the frame $a$ is of a peculiar form, and therefore is adapted for having the parts before described arranged to one side of the path which the horse travels.

What I claim as my invention, and desire to secure by Letters Patent, is—

The arrangement of the shares $i$ $h$, revolving cutters $g$ $g$, frame $a$, driving-wheel $b$, and gear-wheel $d$ $c$, substantially as and for the purposes set forth.

The above specification of my improvement in cotton-thinning plows signed by me this 13th day of March, 1860.

L. B. JOYNER.

Witnesses:
GOODWIN Y. ATLEE,
R. W. FENWICK.